(12) United States Patent
Lee et al.

(10) Patent No.: US 12,524,836 B2
(45) Date of Patent: Jan. 13, 2026

(54) IMAGE PROCESSING DEVICE AND OPERATING METHOD THEREFOR

(71) Applicant: SAMSUNG ELECTRONICS CO., LTD., Suwon-si (KR)

(72) Inventors: Tammy Lee, Suwon-si (KR); Soo Min Kang, Suwon-si (KR); Jaeyeon Park, Suwon-si (KR); Youngchan Song, Suwon-si (KR); Iljun Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 18/120,832

(22) Filed: Mar. 13, 2023

(65) Prior Publication Data

US 2023/0214971 A1    Jul. 6, 2023

Related U.S. Application Data

(63) Continuation of application No. PCT/KR2021/012234, filed on Sep. 8, 2021.

(30) Foreign Application Priority Data

Sep. 18, 2020   (KR) .................. 10-2020-0120632

(51) Int. Cl.
*G06T 5/20* (2006.01)
*G06T 5/70* (2024.01)

(52) U.S. Cl.
CPC .................. *G06T 5/20* (2013.01); *G06T 5/70* (2024.01); *G06T 2207/20012* (2013.01); *G06T 2207/20084* (2013.01)

(58) Field of Classification Search
CPC ... G06T 5/20; G06T 5/70; G06T 2207/20012; G06T 2207/20084; G06T 5/50;
(Continued)

(56) References Cited

U.S. PATENT DOCUMENTS

| 7,813,583 B2 | 10/2010 | Yoo et al. |
| 9,275,438 B2 | 3/2016 | Wang et al. |

(Continued)

FOREIGN PATENT DOCUMENTS

| CN | 111563858 A | 8/2020 |
| JP | 2020-123372 A | 8/2020 |

(Continued)

OTHER PUBLICATIONS

US 11,263,789 B2, 03/2022, Lim et al. (withdrawn)

(Continued)

*Primary Examiner* — Andrae S Allison
(74) *Attorney, Agent, or Firm* — Sughrue Mion, PLLC

(57) ABSTRACT

An image processing apparatus includes: a memory storing one or more instructions; and a processor configured to execute the one or more instructions to: obtain similarity information, based on a pixel difference between each pixel included in a first image and an adjacent pixel of each pixel included in the first image; determine weight information based on the similarity information; obtain first feature information by performing a convolution operation between the first image and a first kernel; obtain second feature information by applying the weight information to the first feature information; and generate a second image based on the second feature information.

12 Claims, 10 Drawing Sheets

(58) Field of Classification Search
CPC ............. G06T 5/60; G06T 2207/20192; G06T 3/4046; G06T 2207/20182
See application file for complete search history.

(56) References Cited

U.S. PATENT DOCUMENTS

| | | | |
|---|---|---|---|
| 9,654,797 | B2 | 5/2017 | Min et al. |
| 9,721,330 | B2 | 8/2017 | Chen et al. |
| 10,558,750 | B2 | 2/2020 | Lu et al. |
| 2007/0177816 | A1 | 8/2007 | Yoo et al. |
| 2015/0093041 | A1 | 4/2015 | Kang |
| 2019/0188237 | A1* | 6/2019 | Chen ............... G06F 17/15 |
| 2019/0220963 | A1 | 7/2019 | Popovic et al. |
| 2021/0127135 | A1* | 4/2021 | Lee ............... H04N 19/59 |
| 2021/0150678 | A1* | 5/2021 | Yi ............... G06T 3/4046 |
| 2022/0019844 | A1* | 1/2022 | Park ............... G06N 3/04 |
| 2022/0067880 | A1 | 3/2022 | Lim et al. |
| 2022/0076062 | A1 | 3/2022 | Lee et al. |
| 2022/0188557 | A1* | 6/2022 | Ahn ............... G06V 10/774 |

FOREIGN PATENT DOCUMENTS

| | | |
|---|---|---|
| KR | 10-1225056 B1 | 1/2013 |
| KR | 10-1558532 B1 | 10/2015 |
| KR | 10-1776501 B1 | 9/2017 |
| KR | 10-1785857 B1 | 11/2017 |
| KR | 10-1874102 B1 | 7/2018 |
| KR | 10-2019-0113119 A | 10/2019 |
| KR | 10-2095685 B1 | 4/2020 |
| KR | 10-2109372 B1 | 5/2020 |
| KR | 10-2020-0067631 A | 6/2020 |
| KR | 10-2020-0071404 A | 6/2020 |
| KR | 2020-0067631 * | 6/2020 |
| KR | 10-2236582 B1 | 4/2021 |

OTHER PUBLICATIONS

Zuo, W., Zhang, K., Zhang, L. (2018). Convolutional Neural Networks for Image Denoising and Restoration. In: Bertalmio, M. (eds) Denoising of Photographic Images and Video. Advances in Computer Vision and Pattern Recognition. Springer, Cham. (Year: 2018).*

Shahdoosti, Hamid Reza, and Zahra Rahemi. "Edge-preserving image denoising using a deep convolutional neural network." Signal Processing 159 (2019): 20-32. (Year: 2019).*

Hang Su et al., "Pixel-Adaptive Convolutional Neural Networks", (Apr. 10, 2019), (13 pages).

International Search report issued Dec. 8, 2021 by the International Searching Authority in International Application No. PCT/KR2021/012234.

Communication issued Oct. 24, 2024 by the Korean Intellectual Property Office in Korean Patent Application No. 10-2020-0120632.

Liu et al., "Learning recursive filters for low-level vision via a hybrid neural network", Computer Vision—14th European Conference, ECCV 2016, Proceedings, Sep. 17, 2016, pp. 560-576, https://doi.org/10.1007/978-3-319-46493-0_34.

Communication issued Feb. 21, 2024 by the European Patent Office in European Patent Application No. 21869623.5.

Qian Depeng, "Non local means filtering of brain magnetic resonance images based on pixel selection", Foreign Electronic Measurement Technology, vol. 37, No. 9, Sep. 2018, pp. 6-9, DOI: 10.19652/j.cnki.femt.1800939.

Communication dated Oct. 20, 2025 issued by the China National Intellectual Property Administration in Chinese Patent Application No. 202180064086.2.

* cited by examiner

FIG. 6
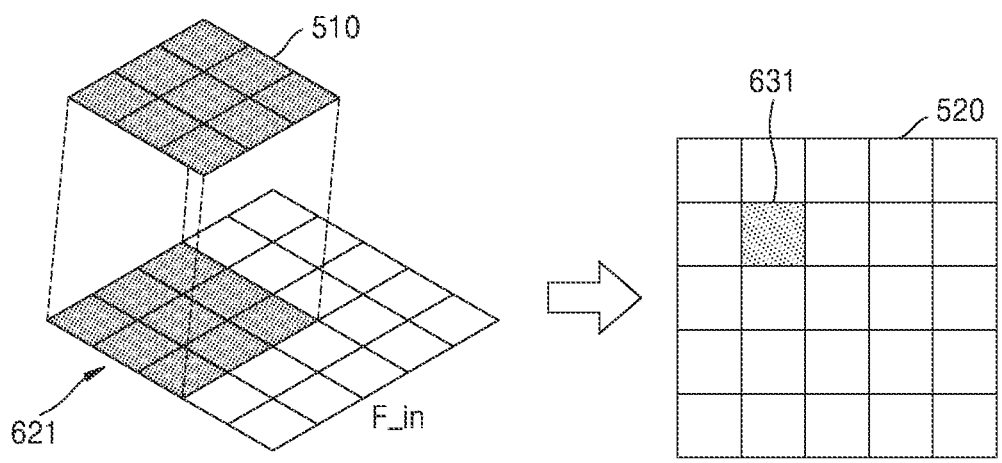
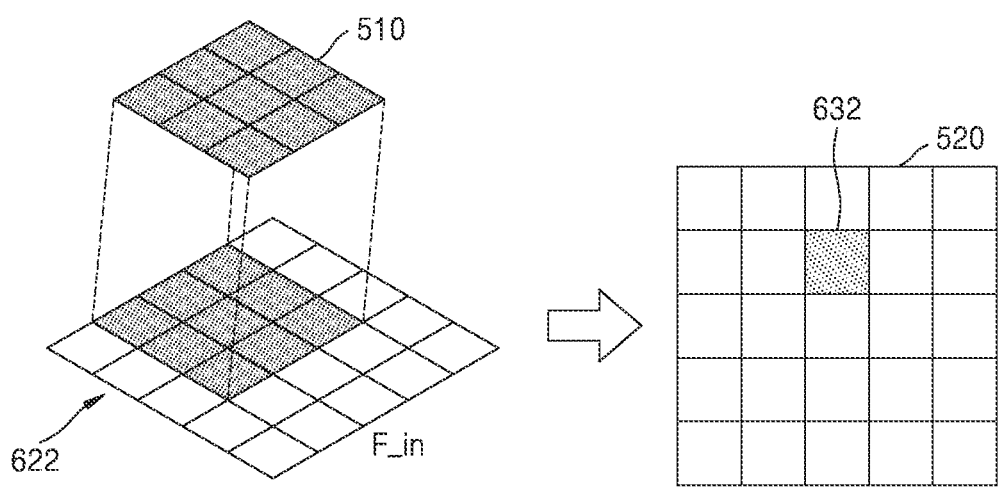

IMAGE PROCESSING DEVICE AND OPERATING METHOD THEREFOR

CROSS-REFERENCE TO RELATED APPLICATIONS

This application is a bypass continuation of International Application No. PCT/KR2021/012234, filed on Sep. 8, 2021, which is based on and claims priority to Korean Patent Application No. 10-2020-0120632, filed on Sep. 18, 2020, the disclosures of which are incorporated by reference herein in their entireties.

BACKGROUND

1. Field

The disclosure relates to an image processing apparatus for cancelling noise from an image by using a neural network, and an operating method of the image processing apparatus.

2. Description of Related Art

With technological advancements in computer technology, data traffic has increased, and artificial intelligence has become an important driver for future innovation. Artificial intelligence is a method that mimics human thinking, and is thus applicable to virtually all industries. Examples of representative technologies of artificial intelligence include pattern recognition, machine learning, expert systems, neural networks, and natural language processing.

A neural network models characteristics of biological nerve cells of humans by mathematical expressions and uses an algorithm that mimics a human's learning ability. Through this algorithm, the neural network may generate a mapping between input data and output data, and the ability to generate this mapping may be expressed as the learning ability of the neural network. In addition, the neural network has a generalization ability to generate correct output data with respect to input data that has not been used for learning, based on a learning result.

When image denoising is performed using a deep neural network (e.g., a deep-layered convolutional neural network (CNN)), adaptive processing may be performed according to local characteristics of pixels. However, when a number of layers included in the CNN is reduced due to limitations in an amount of computation, there may be a problem in that performance of adaptive processing deteriorates.

SUMMARY

Provided are an image processing apparatus capable of performing denoising by using a convolutional neural network, and an operating method of the image processing apparatus.

Further, provided is an image processing apparatus that may further emphasize features of adjacent pixels having similar features when image processing is performed in each of a plurality of pixels included in an image, by using each of the pixels and adjacent pixels, and accordingly, adaptive image processing may be performed according to local characteristics of pixels.

In addition, provided is an image processing apparatus that may perform, by using a neural network, denoising for fine edge processing and maintaining texture while cancelling noise from an input image.

Further still, provided is a neural network that denoises an input image, adaptive processing performance according to local characteristics of pixels does not deteriorate even though the number of layers is reduced.

Additional aspects will be set forth in part in the description which follows and, in part, will be apparent from the description, or may be learned by practice of the presented embodiments.

According to an aspect of the disclosure, an image processing apparatus includes: a memory storing one or more instructions; and a processor configured to execute the one or more instructions to: obtain similarity information, based on a pixel difference between each pixel included in a first image and an adjacent pixel of each pixel included in the first image; determine weight information based on the similarity information; obtain first feature information by performing a convolution operation between the first image and a first kernel; obtain second feature information by applying the weight information to the first feature information; and generate a second image based on the second feature information.

The processor may be further configured to execute the one or more instructions to: obtain first similarity information, based on a pixel difference between each pixel included in the first image and a first adjacent pixel at a first relative position with respect to each pixel included in the first image, and obtain second similarity information, based on a pixel difference between each pixel included in the first image and a second adjacent pixel at a second relative position with respect to each pixel included in the first image.

The processor may be further configured to execute the one or more instructions to determine the weight information by applying a natural exponential function or a softmax function to the similarity information.

A number of channels of the first kernel may be determined such that a number of channels of the weight information is equal to a number of channels of the first feature information.

The processor may be further configured to execute the one or more instructions to obtain the second feature information by performing an elementwise multiplication operation of the weight information and the first feature information.

The processor may be further configured to execute the one or more instructions to: obtain third feature information by performing a convolution operation between the second feature information and a second kernel, and generate the second image based on the third feature information.

The processor may be further configured to execute the one or more instructions to: obtain second weight information through a convolution operation between the weight information and a third kernel, obtain fourth feature information by applying the second weight information to the second feature information, and generate the second image based on the fourth feature information.

The processor may be further configured to execute the one or more instructions to obtain the fourth feature information by performing an elementwise multiplication operation of the second feature information and the second weight information.

The processor may be further configured to execute the one or more instructions to generate the second image by processing the first image by using a neural network including a plurality of layers, the first image may be input to an n-th layer among the plurality of layers, and the second feature information may be input to a (n+1)th layer among the plurality of layers.

According to an aspect of the disclosure, an operating method of an image processing apparatus, includes: obtaining similarity information, based on a pixel difference between each pixel included in a first image and an adjacent pixel of each pixel included in the first image; determining weight information based on the similarity information; obtaining first feature information by performing a convolution operation between the first image and a first kernel; obtaining second feature information by applying the weight information to the first feature information; and generating a second image based on the second feature information.

The obtaining the similarity information may include: obtaining first similarity information, based on a pixel difference between each pixel included in the first image and a first adjacent pixel at a first relative position with respect to each pixel included in the first image; and obtaining second similarity information, based on a pixel difference between each pixel included in the first image and a second adjacent pixel at a second relative position with respect to each pixel included in the first image.

The determining the weight information may include determining weight information by applying a natural exponential function or a softmax function to the similarity information.

a number of channels of the first kernel is determined such that a number of channels of the weight information may be equal to a number of channels of the first feature information.

The obtaining the second feature information may include obtaining the second feature information by performing an elementwise multiplication operation of the weight information and the first feature information.

According to an aspect of the disclosure, a non-transitory computer-readable recording medium has stored thereon a program, which when executed by a computer, performs a method including: obtaining similarity information, based on a pixel difference between each pixel included in a first image and an adjacent pixel of each pixel included in the first image; determining weight information based on the similarity information; obtaining first feature information by performing a convolution operation between the first image and a first kernel; obtaining second feature information by applying the weight information to the first feature information; and generating a second image based on the second feature information.

According to an aspect of the disclosure, an image processing apparatus includes: a memory configured to store one or more instructions; and a processor configured to execute the one or more instructions to: obtain similarity information, based on a pixel difference between each pixel included in a first image and an adjacent pixel of each pixel included in the first image; obtain first feature information by performing a convolution operation between the first image and a first kernel; obtain second feature information by applying weight information to the first feature information; and generate a second image based on the second feature information.

The processor may be further configured to execute the one or more instructions to determine the weight information such that a weight value increases as the pixel difference between each pixel included in the first image and the adjacent pixel decreases, and the weight value decreases as the pixel difference between each pixel included in the first image and the adjacent pixel increases.

The processor may be further configured to execute the one or more instructions to perform an activation function operation on the first feature information.

A size of the first feature information may be equal to a size of the first image.

The processor may be further configured to execute the one or more instructions to obtain the second feature information by passing the second feature information through convolution layers positioned next to an edge preservation filter block.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5 and 6 are diagrams illustrating a convolution operation, according to an embodiment;

DETAILED DESCRIPTION

Figure 1:
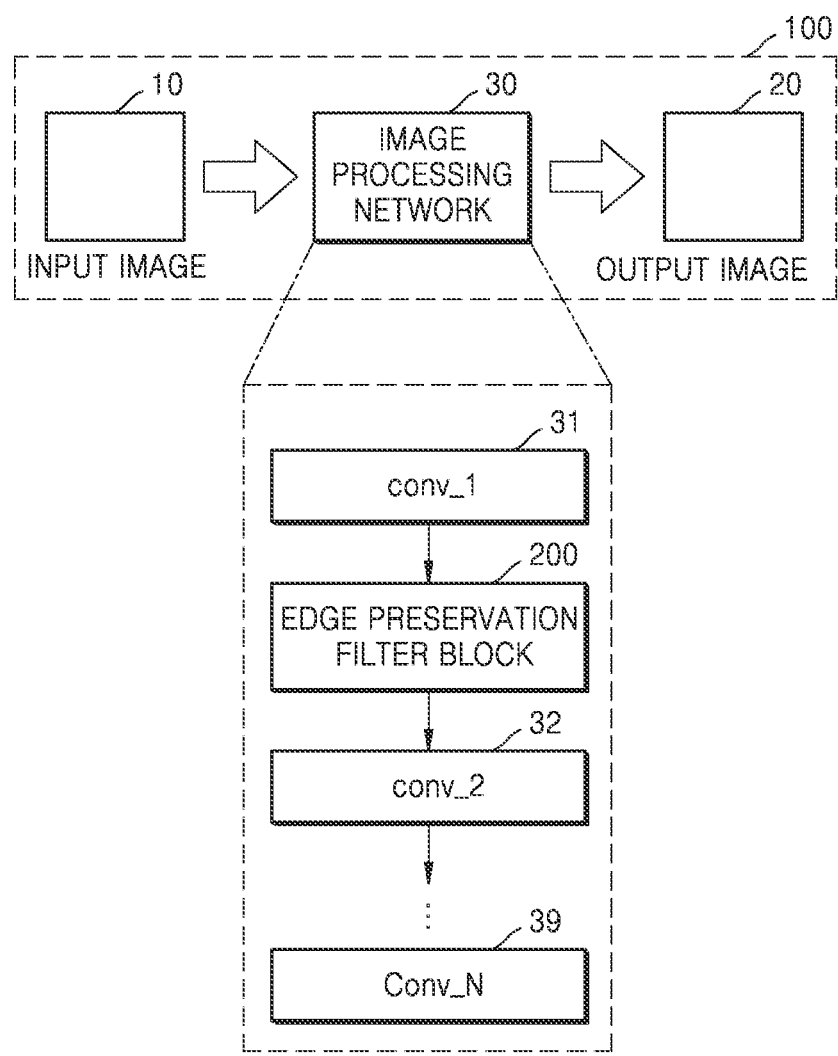
FIG. 1 is a diagram illustrating an image processing operation, performed by an image processing apparatus by using an image processing network, according to an embodiment.

Below, terms used in the specification will be briefly described, and the disclosure will be described in detail.

The terms used in the disclosure are those general terms currently widely used in the art in consideration of functions in regard to the disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the disclosure should be understood not as simple names but based on the meaning of the terms and the overall description of the disclosure.

Throughout the specification, when a portion "includes" an element, another element may be further included, rather than excluding the existence of the other element, unless otherwise specified. In addition, terms such as " . . . or/er", " . . . module", or the like refer to units that perform at least one function or operation, and the units may be implemented as hardware or software or as a combination of hardware and software.

Embodiments will now be described with reference to the accompanying drawings in such a manner that the embodiments may be easily carried out by one of skill in the art. The disclosure may, however, be embodied in many different forms and should not be construed as limited to the embodiments set forth herein. In addition, elements not related to description are omitted in the drawings for clear description of the disclosure, and like reference numerals in the drawings denote like elements throughout the specification.

FIG. 1 is a diagram of an image processing operation, performed by an image processing apparatus by using an image processing network, according to an embodiment.

Referring to FIG. 1, an image processing network 30, according to an embodiment, may receive an input image 10, and generate an output image 20 by processing the input image 10. In this case, the input image 10 may include noise. An image processing apparatus 100 may generate the output image 20 by performing denoising for fine edge processing and maintaining texture while cancelling noise from the input image 10, by using the image processing network 30.

The image processing network 30, according to an embodiment, may include one or more convolution layers 31, 32, . . . , 39 and at least one edge preservation filter block 200. FIG. 1 illustrates that the edge preservation filter block 200 is positioned between a first convolution layer 31 and a second convolution layer 32, but is not limited thereto.

The edge preservation filter block 200, according to an embodiment, is positioned before the first convolution layer 31 and may be connected to an input of the image processing network 30. Alternatively, the edge preservation filter block 200 may be positioned between two adjacent convolution layers among the second to an N-th convolution layers 32, . . . , 39. Also, two or more edge preservation filter blocks 200 may be consecutively positioned between two adjacent convolution layers among the first to N-th convolution layers 31, 32, . . . , 39. Alternatively, the edge preservation filter block 200 is positioned after the N-th convolution layer 39 and may be connected to an output of the image processing network 30.

In addition, in each of the convolution layers 31, 32, . . . , 39 included in the image processing network 30, a feature map (feature information) may be generated through a convolution operation between a kernel and an image input to a convolution layer, and an activation function operation for applying an activation function to the feature map may be performed. The activation function operation assigns a non-linear characteristic to a feature map generated as a result of the convolution operation, and the activation function may include a sigmoid function, a Tanh function, a rectified linear unit (ReLU) function, a leaky ReLU function, or the like. However, the disclosure is not limited thereto.

Also, the edge preservation filter block 200 may also obtain feature information by performing the convolution operation between the input image and the kernel, the activation function operation, and the like. The edge preservation filter block 200 obtains similarity information with respect to an adjacent pixel and applies the similarity information to the feature information, and thus, a local characteristic (e.g., an edge characteristic, a texture characteristic, or the like) of the input image may be considered in the feature information.

Image processing performed by the edge preservation filter block 200, according to an embodiment, is described in detail with reference to the drawings below.

Figure 2:
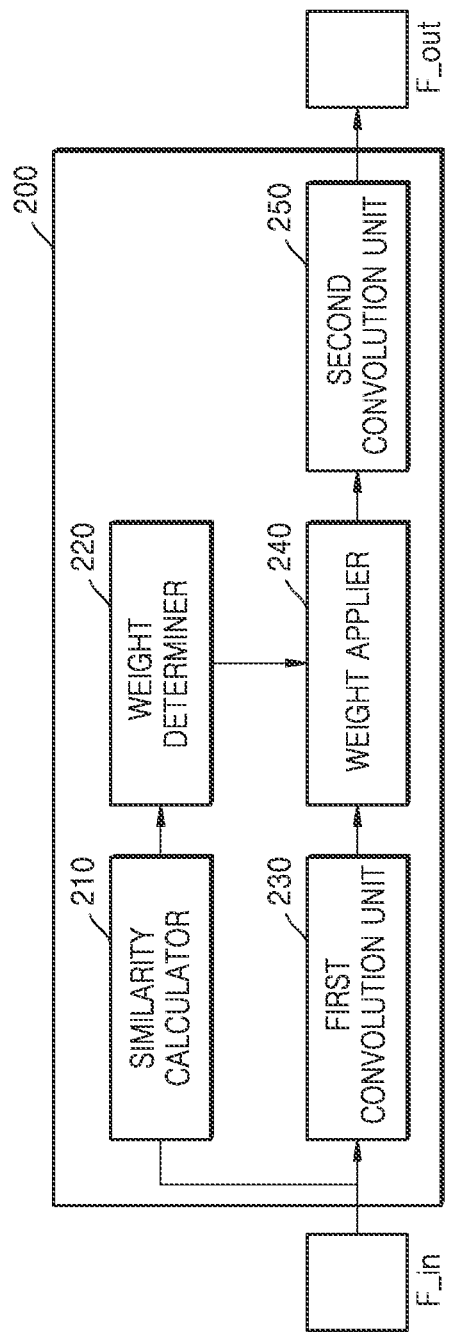
FIG. 2 is a diagram illustrating an edge preservation filter block, according to an embodiment.

FIG. 2 is a diagram of an edge preservation filter block, according to an embodiment.

Referring to FIG. 2, the edge preservation filter block 200, according to an embodiment, may include a similarity calculator 210, a weight determiner 220, a first convolution unit 230, a weight applier 240, and a second convolution unit 250.

The edge preservation filter block 200, according to an embodiment, may include a structure that receives an input of a first image F_in and outputs a second image F_out, and the first image F_in and the second image F_out may have the same size and different numbers of channels. However, the disclosure is not limited thereto.

Also, the edge preservation filter block 200 is positioned before the first convolution layer 31 of FIG. 1 and may be connected to the input of the image processing network 30. In this case, the first image F_in of FIG. 2 may be the same as the input image 10 of the image processing network 30. Alternatively, when the edge preservation filter block 200 is positioned after an m-th convolution layer among a plurality of convolution layers, the first image F_in of FIG. 2 may be feature information output from the m-th convolution layer (a previous layer of an edge preservation filter block).

Also, the second image F_out of FIG. 2 may be feature information input to a next layer of the edge preservation filter block 200.

An operation performed by the edge preservation filter block 200 of FIG. 2 is described in detail with reference to FIG. 3.

Figure 3:
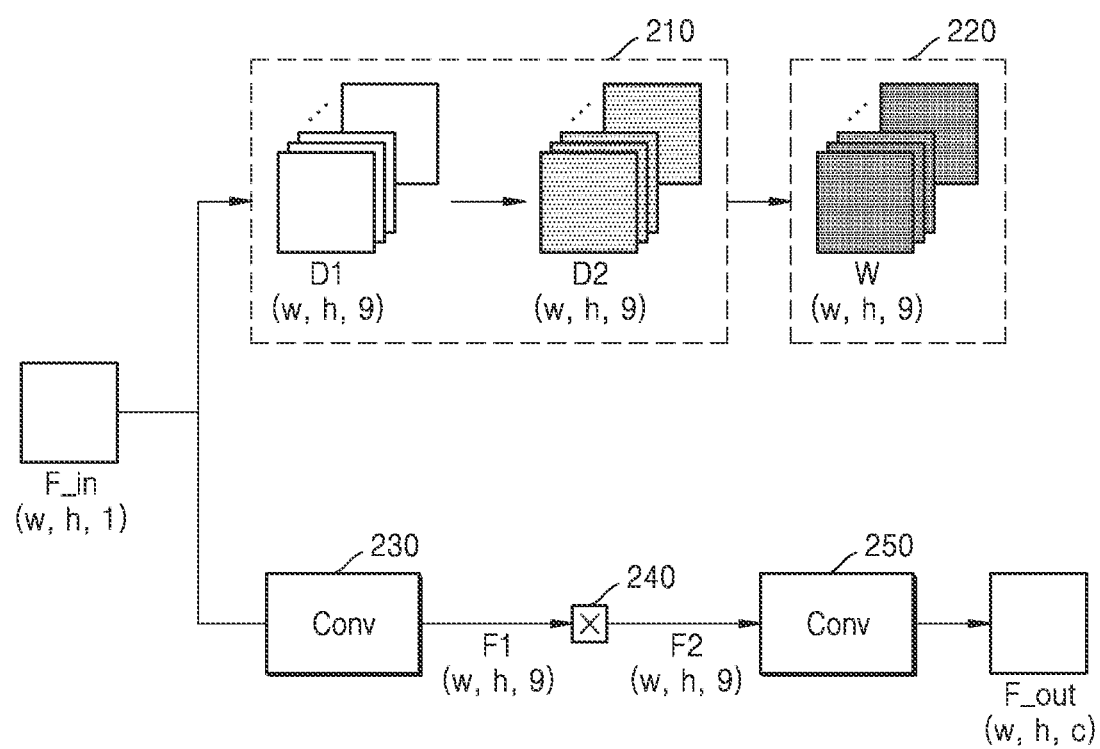
FIG. 3 is a diagram illustrating an operation of an edge preservation filter block, according to an embodiment.

FIG. 3 is a diagram illustrating an operation of an edge preservation filter block, according to an embodiment.

For convenience of description, FIG. 3 is described based on an assumption that a width of the first image F_in is w, a height thereof is h, and the number of channels thereof is 1. The similarity calculator 210 may calculate a difference value between each of pixels included in the first image F_in and an adjacent pixel. For example, the similarity calculator 210 may calculate a difference value between a first pixel (e.g., reference pixel) and each of eight pixels positioned around the first pixel (e.g., reference pixel), and nine pixels including the first pixel (e.g., reference pixel) among a plurality of pixels included in the first image F_in. Accordingly, the similarity calculator 210 may obtain nine difference values for the first pixel.

The similarity calculator 210 may obtain, by using each of a plurality of pixels included in a first image as a reference pixel, nine difference values for the plurality of respective pixels in the same manner. Accordingly, the similarity calculator 210 may generate difference information D1, of which the number of channel is 9, with respect to the first image F_in, but is not limited thereto.

The number of channels of the difference information D1 may be variously determined according to a criterion for determining an adjacent pixel. For example, when adjacent pixels are determined as four pixels positioned above and below, and in the left and right of the first pixel, the number of channels of the difference information D1 may be 5. Also, a size (w×h) of the difference information D1, according to an embodiment, may be equal to a size (w×h) of the first image F_in.

A first channel image of the difference information D1 of FIG. 3 may indicate a difference value between each of the pixels included in the first image F_in and an adjacent pixel (e.g., a pixel adjacent to the right of each of the pixels) at a first relative position with respect to each of the pixels. In this case, the first channel image of the difference information D1 may refer to an image (information) corresponding to a first channel of the difference information D1.

Alternatively, a second channel image corresponding to a second channel of the difference information D1 may indicate a difference value between each of the pixels included in the first image F_in and an adjacent pixel (e.g., a pixel adjacent to the left of each of the pixels) at a second relative position with respect to each of the pixels.

The similarity calculator 210, according to an embodiment, may obtain the difference information D1 by performing mask processing on the first image F_in. For example, when the similarity calculator 210 obtains difference information with respect to eight pixels positioned around a pixel (e.g., reference pixel), as shown in FIG. 4, the similarity calculator 210 may perform mask processing by using eight mask filters M1, M2, M3, M4, M5, M6, M7, and M8, each having a size of 3×3.

Figure 4:
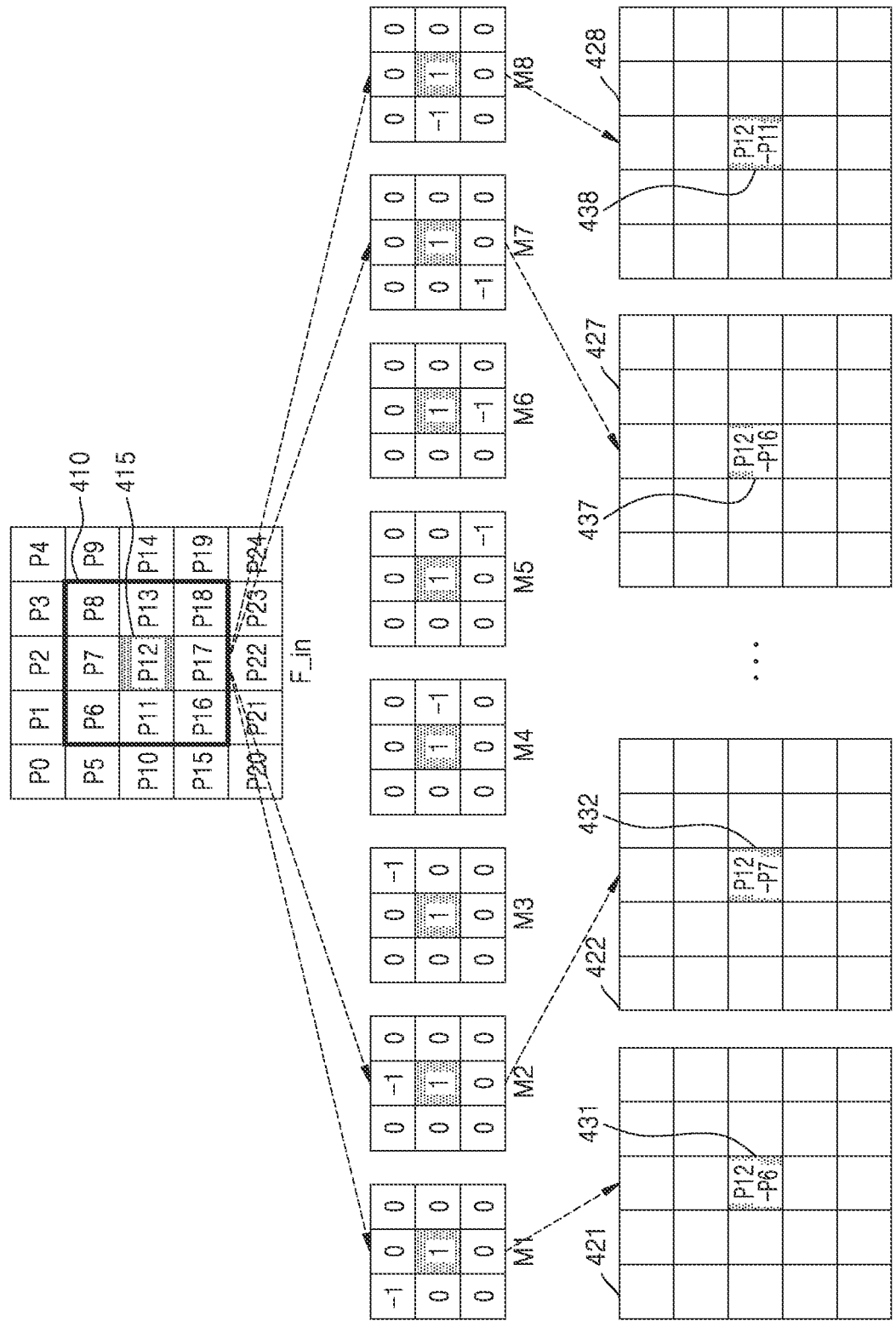
FIG. 4 is a diagram illustrating a method of obtaining difference information D1, according to an embodiment.

FIG. 4 is a diagram illustrating a method of obtaining difference information D1, according to an embodiment.

For convenience of description, FIG. 4 is described based on an assumption that the first image F_in has a size of 5×5. Mask processing may be performed through a convolution operation between the first image F_in and each of mask filters. Accordingly, when eight mask filters are included, eight channel images 421, 422, . . . , 427, and 428 included in the difference information D1 may be generated through mask processing. For example, the similarity calculator 210 may generate a first channel image 421 of the difference information D1 through a convolution operation between the first image F_in and a first mask filter M1, and generate a second channel image 422 of the difference information D1 through a convolution operation between the first image F_in and a second mask filter.

Referring to FIG. 4, the similarity calculator 210 may calculate a pixel value included in the difference information D1, by respectively multiplying pixel values included in a 3×3-sized region included in the first image F_in and pixel values (parameter values) included in each of the mask filters, and summing results of the calculations.

In this case, parameter values included in a mask filter may be determined according to a position of an adjacent pixel for calculating difference information. For example, the first mask filter M1 may be a mask filter for calculating difference information between the reference pixel and a pixel that is positioned at the upper left of the reference pixel. Accordingly, in the first mask filter M1, a value of a center pixel may be '1', a value of a pixel positioned at the upper left of the center pixel may be '−1', and values of other pixels may be '0'.

The similarity calculator 210, according to an embodiment, may calculate a value of a second pixel 431 included in the first channel image 421 of the difference information D1, by performing a convolution operation between the first mask filter M1 and a first region 410 having a first pixel 415 as a center. In this case, a position of the first pixel 415 in the first image F_in and a position of the second pixel 431 in the first channel image 421 of the difference information D1 may be the same. The value of the second pixel 431 included in the first channel image 421 may be a value obtained by subtracting a pixel value P6 that is positioned at the upper left of the first pixel 415, from a first pixel value P12.

In the same manner, a region that is subject to a convolution operation may be changed such that each of the pixels included in the first image F_in is positioned at a center of the region that is subject to the convolution operation, in which case a pixel positioned at the center of the region is the reference pixel. The similarity calculator 210 may calculate pixel values included in the first channel image 421, by performing a convolution operation between the changed region and the first mask filter M1.

Also, a second mask filter M2 may be a mask filter for calculating difference information between the reference pixel and a pixel that is positioned above the reference pixel. Accordingly, in the second mask filter M2, a value of a center pixel may be '1', a value of a pixel positioned above the center pixel may be '−1', and values of other pixels may be '0'.

The similarity calculator 210 may calculate a value of a third pixel 432 included in the second channel image 422 of the difference information D1, by performing a convolution operation between the second mask filter M2 and the first region 410 having the first pixel 415 as the center. In this case, a position of the first pixel 415 in the first image F_in and a position of the third pixel 432 in the second channel image 422 may be the same. Accordingly, the value of the third pixel 432 included in the second channel image 422 may be a value obtained by subtracting a pixel value P7 that is positioned above the first pixel 415, from the first pixel value P12.

The similarity calculator 210 may calculate a value of an eighth pixel 437 included in the seventh channel image 427 of the difference information D1, by performing a convolution operation between the seventh mask filter M7 and the first region 410 having the first pixel 415 as the center. In this case, a position of the first pixel 415 in the first image F_in and a position of the eighth pixel 437 in the seventh channel image 427 may be the same. Accordingly, the value of the eight pixel 437 included in the seventh channel image 427 may be a value obtained by subtracting a pixel value P16 that is positioned below and to the left of the first pixel 415, from the first pixel value P12.

The similarity calculator 210 may calculate a value of an ninth pixel 438 included in the eighth channel image 428 of the difference information D1, by performing a convolution operation between the eighth mask filter M8 and the first region 410 having the first pixel 415 as the center. In this case, a position of the first pixel 415 in the first image F_in and a position of the ninth pixel 438 in the seventh channel image 428 may be the same. Accordingly, the value of the ninth pixel 438 included in the eighth channel image 428 may be a value obtained by subtracting a pixel value P11 that is positioned to the left of the first pixel 415, from the first pixel value P12.

In the same manner, a region that is subject to a convolution operation is changed such that each of the pixels included in the first image F_in is positioned at a center of the region that is subject to the convolution operation, and a convolution operation between the changed region and the second mask filter M2 is performed, and thus, values of the pixels included in the second channel image 422 may be calculated.

Also, a third mask filter M3 may be a mask filter for calculating difference information between the reference pixel and a pixel that is positioned at the upper right of the reference pixel, and a fourth mask filter M4 may be a mask filter for calculating difference information between the reference pixel and a pixel that is positioned in the right of the reference pixel. Other mask filters (fifth to eighth mask filters M5, M6, M7, and M8) are also mask filters for calculating difference information between the reference pixel and adjacent pixels (pixels positioned around the reference pixel).

The similarity calculator 210, according to an embodiment, may obtain the difference information D1 including difference values between respective pixels included in the first image F_in and adjacent pixels at first to eighth relative positions with respect to the respective pixels, by performing mask processing using eighth mask filters as shown and described with reference to FIG. 4. For example, the similarity calculator 210 may generate first to eighth channel images 421, 422, 423, 424, 425, 426, 427, and 428 of the difference information D1 by using first to eighth masks M1, M2, M3, M3, M4, M5, M6, M7, and M8.

Also, the difference information D1, according to an embodiment, may include a ninth channel image in which all pixel values are '0'. For example, the ninth channel image may be an image indicating difference information for each of the pixels included in the first image F_in from the each of the pixels itself.

In addition, the mask processing shown in FIG. 4 is merely an example of a method of obtaining the difference information D1, and the similarity calculator 210 may obtain difference information between each of the pixels included in the first image F_in and the adjacent pixel, by using various methods.

Referring back to FIG. 3, the similarity calculator 210 may generate similarity information D2 by performing a certain operation on each value included in the difference information D1. The similarity information D2, according to an embodiment, may include a value indicating a degree of similarity between the reference pixel and the adjacent pixel.

For example, the similarity calculator 210 may generate the similarity information D2 by squaring each value included in the difference information D1 and multiplying the squared value by −1. Accordingly, when the similarity information D2 has a large value in a negative direction, it may mean that a difference between the reference pixel and the adjacent pixel is large, and when the similarity information has a small value in the negative direction, it may mean that the reference pixel and the adjacent pixel are similar to each other. However, the disclosure is not limited thereto, and the similarity calculator 210 may generate the similarity information D2 by performing various operations on the difference information D1.

The similarity information D2, according to an embodiment, may have the same size and number of channels as the difference information D1.

The weight determiner 220, according to an embodiment, may determine weight information W based on the similarity information D2. The weight determiner 220 may determine weight values included in the weight information W, based on values included in the similarity information D2. The weight determiner 220 may determine the weight information W, such that a weight value increases as a difference between the reference pixel and the adjacent pixel decreases (the more the reference pixel and the adjacent pixel are the same or similar), and the weight value decreases as the difference between the reference pixel and the adjacent pixel increases (the more the reference pixel and the adjacent pixel are different). Accordingly, when the weight information W is applied to first feature information F1 to be described below, features of adjacent pixels that are identical to or similar to the reference pixel may be emphasized.

For example, the weight determiner 220 may determine weight values, such that each weight value is closer to 0 as magnitudes of the values included in the similarity information D2 increase in the negative direction, and each weight value is closer to 1 as the magnitudes of the values included in the similarity information decrease in the negative direction. In this case, the weight determiner 220 may calculate the weight information W by applying a natural exponential function or a softmax function to the values included in the similarity information D2. For example, when the weight information W is calculated by applying the natural exponential function, it may be represented by Equation 1.

$$W(x_i) = \exp(D2(x_i))  \quad\quad\quad \text{[Equation 1]}$$

In Equation 1, $D2(x_i)$ refers to a value at a position i among values included in similarity information, and $W(x_i)$ refers to a value at a position i among values included in weight information.

Also, when the weight information W is calculated by applying the softmax function, it may be expressed by Equation 2.

$$W(x_i) = \frac{\exp(D2(x_i))}{\sum_j \exp(D2(x_i))} \quad\quad\quad \text{[Equation 2]}$$

In Equation 2, $D2(x_i)$ refers to a value at a position i among the values included in the similarity information, and $D2(x_j)$ refers to a value at a position j in the similarity information. Also, $W(x_i)$ refers to a value at a position i among the values included in the weight information.

Moreover, referring to FIG. 3, the first convolution unit 230 may generate first feature information F1 by performing a convolution operation between the first image F_in and the first kernel.

Hereinafter, a method of generating the first feature information F1 by performing the convolution operation is described with reference to FIGS. 5 and 6.

Figure 5:
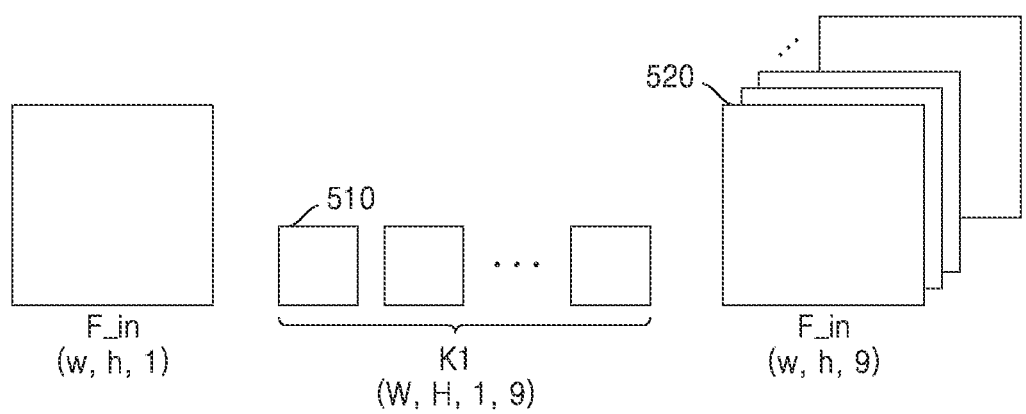

FIGS. 5 and 6 are diagrams illustrating a convolution operation, according to an embodiment.

FIG. 5 is a diagram of first image F_in input to the first convolution unit 230, a first kernel K1, and first feature information F1, according to an embodiment.

Referring to FIG. 5, a size of the first image F_in input to the first convolution unit 230, according to an embodiment, may be w×h, and the number Cin of channels may be 1. However, in FIG. 5, for convenience of descriptions, it is assumed that the number Cin of channels of the first image F_in is 1, but the disclosure is not limited thereto.

Also, the first convolution unit 230 may include the first kernel K1, and the first kernel K1 may include Cout sub-kernels. In addition, one sub-kernel may have a size of W×H×Cin. The number Cin of channels of one sub-kernel may be equal to the number Cin of channels of the first image F_in. In FIG. 5, for convenience of descriptions, it is assumed that a size of one sub-kernel is W×H, the number Cin of channels of one sub-kernel is 1, and the number Cout of sub-kernels is 9.

The first convolution unit 230 may generate the first feature information F1 by performing a convolution operation between the first image F_in and the first kernel K1. In this case, a size of the first feature information F1 may be w×h, and the number of channels of the first feature information F1 may be determined by the number Cout of sub-kernels of the first kernel K1. The number of channels of the first feature information F1 may be 9 (Cout).

FIG. 6 is a diagram illustrating a process of generating a first channel image 520 of the first feature information F1 through a convolution operation between the first image F_in and a first sub-kernel 510 included in the first kernel K1, according to an embodiment.

In FIG. 6, for convenience of descriptions, it is assumed that the first image F_in has a size of 5×5, and the number of channels thereof is 1. Also, it is assumed that one sub-kernel included in the first kernel K1 applied to the first image F_in has a size of 3×3, and the number of channel of the sub-kernel is 1.

Referring to FIG. 6, a process of extracting features of the first image F_in by applying the first sub-kernel 510 from an upper left end to a lower right end of the first image F_in is shown. For example, the convolution operation may be performed by applying the first sub-kernel 510 to pixels included in a 3×3-sized region 621 at an upper left end of the first image F_in. That is, one pixel value 631 mapped to the upper-left 3×3-sized region 621 may be generated by multiplying pixel values included in the upper-left 3×3-sized region 621 and parameter values included in the first sub-kernel 510, and summing the products.

Also, one pixel value 632 mapped to a 3×3-sized region 622 may be generated by multiplying pixel values included in the 3×3-sized region 622 shifted by one pixel to the right from the 3×3-sized region 621 at the upper left end of the first image F_in and parameter values included in a first sub-kernel 610, and summing the products. In the same manner, pixel values included in a first channel image 630 of the first feature information F1 may be generated by multiplying the parameter values included in the first sub-kernel 610 and summing the products, while scanning an object of the convolution operation from left to right and from top to bottom in the first image F_in one pixel at a time. Data that is subject to the convolution operation may be scanned one pixel at a time, but may also be scanned by the number of two or more pixels. The number of pixels by which input data moves in a scanning process is referred to as a stride, and a size of output first feature information F1 may be determined according to a size of the stride. Also, as shown in FIG. 6, padding may be performed such that the size of the first feature information F1 is equal to that of the first image F_in. Padding refers to increasing the size of the first image F_in by assigning a specific value (e.g., '0') to an edge of the first image F_in (input data), in order to prevent a size of output feature information (output data) from decreasing. When a convolution operation is performed after the padding is performed, a size of first feature information may be equal to a size of a first image. However, the disclosure is not limited thereto.

In addition, although only a convolution operation result (the first channel image 520 of the first feature information) for the first sub-kernel 510 is shown in FIG. 6, when a convolution operation is performed on nine sub-kernels, the first feature information F1 including nine channel images may be output. That is, the number of channels of the first feature information F1 may be determined according to the number of sub-kernels included in the first kernel K1. In this case, because the size and number of channels of the first feature information F1 need to be equal to the size and number of channels of the weight information W determined by the weight determiner 220, the number Cout of sub-kernels included in the first kernel K1 may be determined such that the size and number of channels of the first feature information F1 are equal to the size and number of channels of the weight information W determined by the weight determiner 220.

Also, the first convolution unit 230, according to an embodiment, may additionally perform an activation function operation on the first feature information F1 on which the convolution operation is performed. The activation function operation assigns a non-linear characteristic to first feature information, and the activation function may include a sigmoid function, a Tanh function, a ReLU function, or a leaky ReLU function, but is not limited thereto.

Referring back to FIGS. 2 and 3, the weight applier 240 according to an embodiment may apply the weight information W to the first feature information F1. For example, the weight applier 240 may apply the weight information W to the first feature information F1 through an elementwise multiplication operation. The elementwise multiplication operation is an operation of multiplying values at the same position when multiplying values included in the first feature information F1 and values included in the weight information W. Second feature information F2 may be generated by applying the weight information W to the first feature information F1.

The second convolution unit 250 may generate third feature information F_out by performing a convolution operation between the second feature information F2 and a second kernel. A method of performing the convolution operation has been described in detail with reference to FIGS. 5 and 6, and thus, detailed descriptions thereof are not provided again.

The second convolution unit 250 may include the second kernel, the second kernel may include c sub-kernels, and one sub-kernel may have a size of W×H×Cin. The number Cin of channels of one sub-kernel may be equal to the number of channels of the second feature information F2. Also, the number c of sub-kernels may be equal to the number of channels of the third feature information F_out. The third feature information F_out may have a size of w×h, and the number of channels thereof may be c. Also, the second convolution unit 250 may additionally perform an activation function operation on third feature information F3 on which the convolution operation is performed.

The third feature information F_out, according to an embodiment, may be input to a next layer of the edge preservation filter block 200. In this case, the next layer may be any one of the plurality of convolution layers in FIG. 1. For example, when the edge preservation filter block 200 of FIG. 2 is positioned between an m-th convolution layer and a (m+1)th convolution layer, the third feature information F_out may be input to the (m+1)th convolution layer.

In addition, in FIGS. 2 and 3, it has been shown and described that the third feature information F_out is input to the next layer of the edge preservation filter block 200, but the disclosure is not limited thereto. The second feature information F2 may be input to the next layer of the edge preservation filter block 200. In this case, the convolution operation between the second feature information F2 and the second kernel is not performed.

Moreover, at least one of the similarity calculator 210, the weight determiner 220, the first convolution unit 230, the weight applier 240, and the second convolution unit 250, which have been shown and described with reference to FIGS. 2 to 6, may be manufactured in the form of a hardware chip and mounted in the image processing apparatus 100. For example, at least one of the similarity calculator 210, the weight determiner 220, the first convolution unit 230, the weight applier 240, and the second convolution unit 250 may be manufactured in the form of a dedicated hardware chip for artificial intelligence (AI) or as part of an existing general-purpose processor (e.g., a central processing unit (CPU) or an application processor) or a dedicated graphics processor (e.g., a graphics processing unit (GPU)) and mounted in the image processing apparatus 100 according to an embodiment.

Also, at least one of the similarity calculator 210, the weight determiner 220, the first convolution unit 230, the weight applier 240, and the second convolution unit 250 may be implemented in a software module. When at least one of the similarity calculator 210, the weight determiner 220, the first convolution unit 230, the weight applier 240, and the second convolution unit 250 is implemented in a software module (or a program module including instructions), the software module may be stored in a non-transitory computer-readable medium. Also, in this case, at least one software module may be provided by an operating system (OS) or a certain application. Alternatively, some of software modules may be provided by an OS, and some others may be provided by a certain application.

Figure 7:
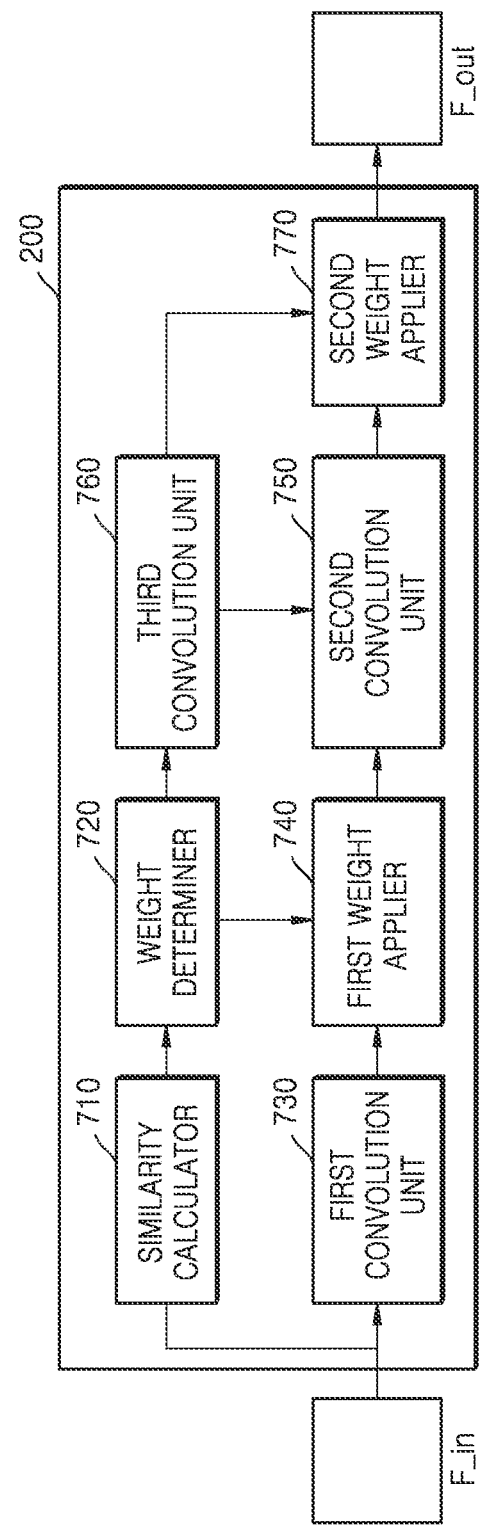
FIGS. 7 and 8 are diagrams illustrating an edge preservation filter block, according to another embodiment.
Figure 8:
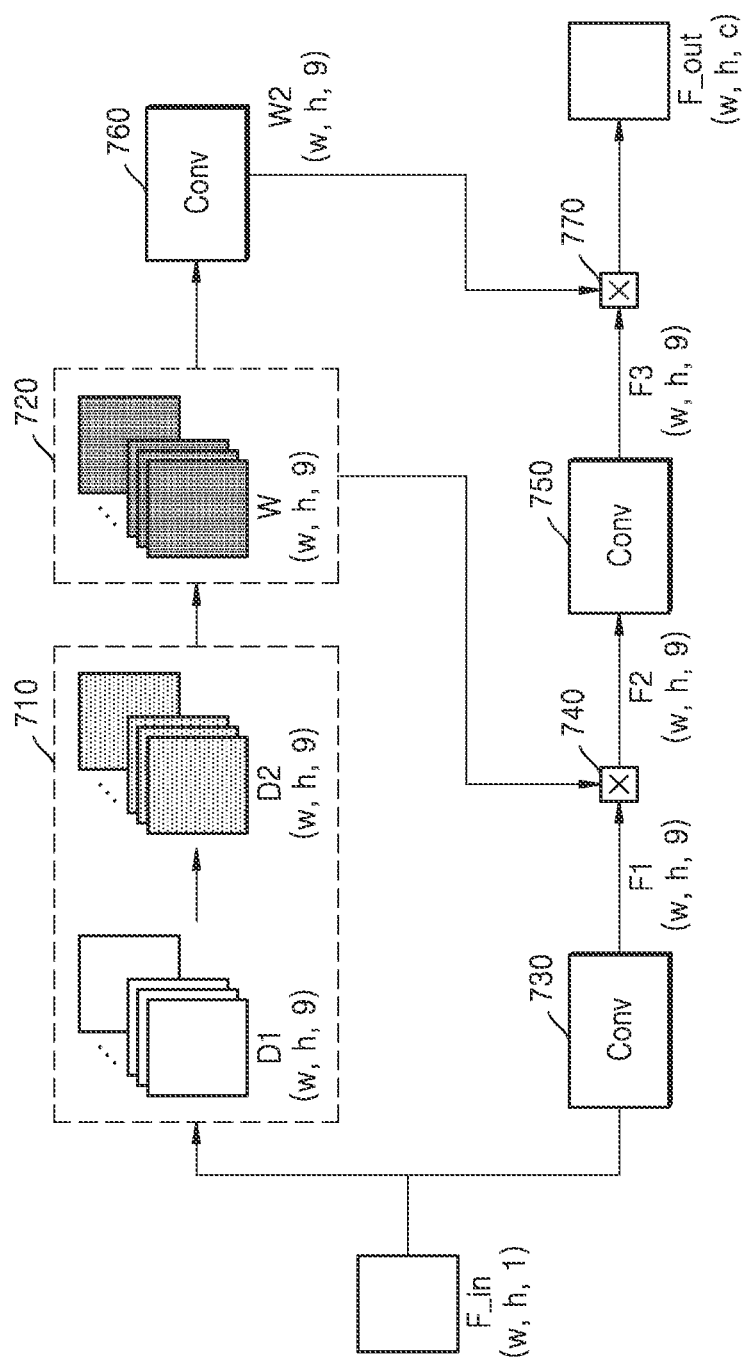

FIGS. 7 and 8 are diagrams of an edge preservation filter block, according to another embodiment.

Referring to FIG. 7, the edge preservation filter block 200, according to an embodiment, may include a similarity calculator 710, a weight determiner 720, a first convolution unit 730, a first weight applier 740, a second convolution unit 750, a third convolution unit 760, and a second weight applier 770.

The similarity calculator 710, the weight determiner 720, the first convolution unit 730, the first weight applier 740, and the second convolution unit 750 of FIG. 7 correspond to the similarity calculator 210, the weight determiner 220, the first convolution unit 230, the weight applier 240, and the second convolution unit 250 of FIG. 2, respectively, and thus, redundant descriptions thereof are not provided herein.

Referring to FIGS. 7 and 8, the third convolution unit 760 may generate second weight information W2 by performing a convolution operation between a third kernel and the weight information W determined by the weight determiner 720. A method of performing the convolution operation has been described in detail with reference to FIGS. 5 and 6, and thus, detailed descriptions thereof are not provided again.

The third convolution unit 760 may include the third kernel, and the third kernel may include a plurality of sub-kernels. In this case, the number of channels of one sub-kernel may be equal to the number of channels of the weight information W, and the number of channels of the second weight information W2 may be equal to the number of sub-kernels.

The second weight applier 770 may apply the second weight information W2 to the third feature information F3. For example, the second weight applier 770 may apply the second weight information W2 to the third feature information F3 through an elementwise multiplication operation. In this case, the size and number of channels of third feature information may be equal to the size and number of channels of second weight information. Fourth feature information F_out may be generated by applying the second weight information W2 to the third feature information F3, and the fourth feature information F_out may be input to a next layer of the edge preservation filter block 200. In this case, the next layer may be any one of the plurality of convolution layers in FIG. 1. For example, when the edge preservation filter block 200 of FIG. 7 is positioned between an m-th convolution layer and a (m+1)th convolution layer, the fourth feature information F_out may be input to the (m+1)th convolution layer.

Also, the edge preservation filter block 200, according to an embodiment, may further include a fourth convolution unit that additionally performs an additional convolution operation and activation function operation on the fourth feature information F_out. Also, feature information generated by the fourth convolution unit through the convolution operation and the activation function operation may be input to the next layer of the edge preservation filter block 200.

In addition, at least one of the similarity calculator 710, the weight determiner 720, the first convolution unit 730, the first weight applier 740, the second convolution unit 750, the third convolution unit 760, and the second weight applier 770, which have been shown and described with reference to FIGS. 7 and 8, may be manufactured in the form of a hardware chip and mounted in the image processing apparatus according to an embodiment. For example, at least one of the similarity calculator 710, the weight determiner 720, the first convolution unit 730, the first weight applier 740, the second convolution unit 750, the third convolution unit 760, and the second weight applier 770 may be manufactured in the form of a dedicated hardware chip for AI or as part of an existing general-purpose processor (e.g., a CPU or an application processor) or a dedicated graphics processor (e.g., a GPU) and mounted in the image processing apparatus 100 according to an embodiment.

Also, at least one of the similarity calculator 710, the weight determiner 720, the first convolution unit 730, the first weight applier 740, the second convolution unit 750, the third convolution unit 760, and the second weight applier 770 may be implemented in a software module. When at least one of the similarity calculator 710, the weight determiner 720, the first convolution unit 730, the first weight applier 740, the second convolution unit 750, the third convolution unit 760, and the second weight applier 770 is implemented in a software module (or a program module including instructions), the software module may be stored in a non-transitory computer-readable medium. Also, in this case, at least one software module may be provided by an OS or a certain application. Alternatively, some of software modules may be provided by an OS, and some others may be provided by a certain application.

In addition, the block diagram of the edge preservation filter block 200 described with reference to FIGS. 2 to 8 is a block diagram for an embodiment. Each component of the block diagram may be integrated, added, or omitted according to the specifications of the image processing apparatus 100 including the edge preservation filter block 200 that is actually implemented. That is, two or more components may be combined into one component, or one component may be subdivided into two or more components as needed. In addition, functions performed by each block are for explaining embodiments, and specific operations or devices thereof do not limit the scope of the disclosure.

Figure 9:
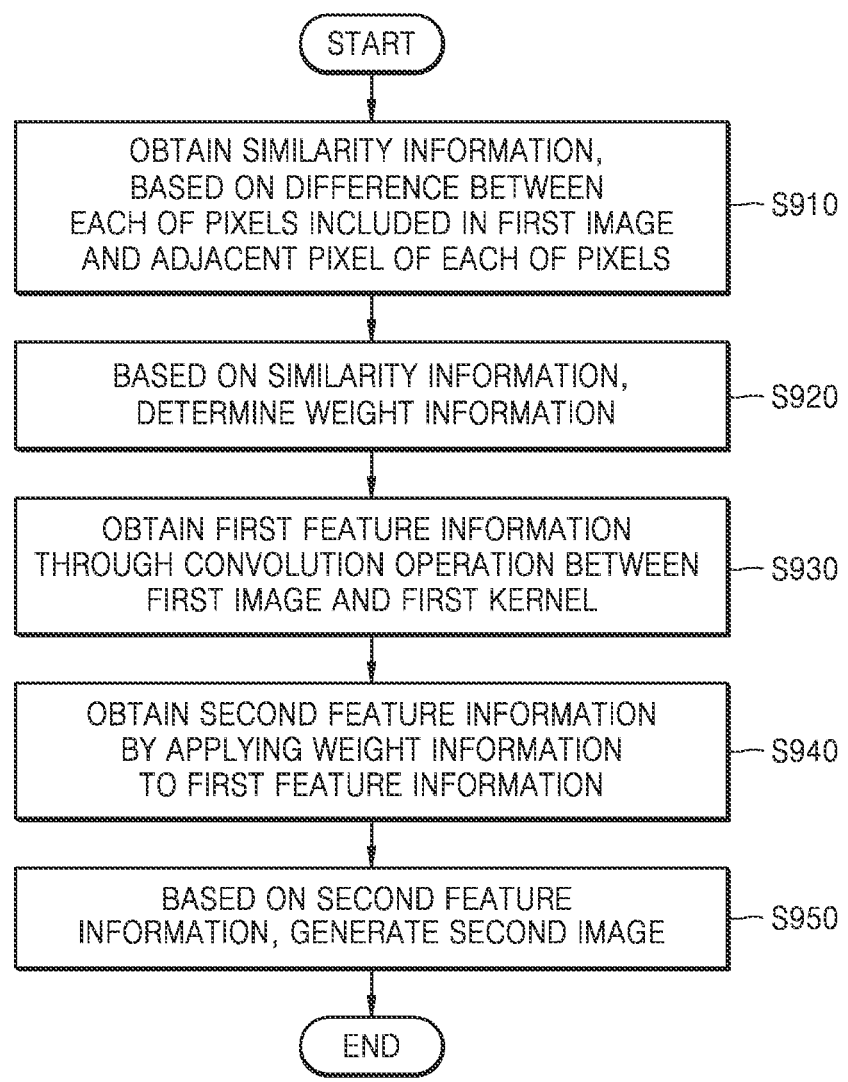
FIG. 9 is a flowchart illustrating an operating method of an image processing apparatus, according to an embodiment.

FIG. 9 is a flowchart of an operating method of an image processing apparatus, according to an embodiment.

Referring to FIG. 9, the image processing apparatus 100, according to an embodiment, may obtain similarity information based on a difference between each of pixels included in a first image and adjacent pixels of each of the pixels (S910).

The image processing apparatus 100, according to an embodiment, may generate difference information D1 indicating the difference between each of the pixels included in the first image and the adjacent pixels of each of the pixels. For example, the image processing apparatus 100 may calculate a difference value between a first pixel (e.g., reference pixel) and each of eight pixels positioned around the first pixel, with respect to the first pixel (e.g., reference pixel), and nine pixels including the first pixel (e.g., reference pixel), among a plurality of pixels included in the first image.

The image processing apparatus 100 may generate the difference information D1 by using calculated difference values. The image processing apparatus 100 may obtain nine difference values for the first pixel (e.g., reference pixel), and each of the nine difference values may be determined to be a pixel value of a pixel corresponding to the first pixel, for each of channel images included in the difference information D1. In this case, the number of adjacent pixels may be determined according to a criterion for determining adjacent pixels of the reference pixel, and the number of channels (number of channel images) of the difference information D1 may be determined according to the number of adjacent pixels.

A method of generating the difference information D1, according to an embodiment, has been described in detail with reference to FIGS. 3 and 4, and thus, detailed descriptions thereof are not provided again.

When the difference information D1 is generated, the image processing apparatus 100 may generate similarity information D2 by performing a certain operation on each value included in the difference information D1. The similarity information D2, according to an embodiment, may include a value indicating a degree of similarity between the reference pixel and an adjacent pixel.

For example, the image processing apparatus 100 may generate the similarity information D2 by squaring each value included in the difference information D1 and multiplying the squared value by −1. Accordingly, when the similarity information D2 has a large value in a negative direction, it may mean that a difference between the reference pixel and the adjacent pixel is large, and when the similarity information has a small value in the negative direction, it may mean that the reference pixel and the adjacent pixel are similar to each other. However, the disclosure is not limited thereto, and the image processing apparatus 100 may generate similarity information by performing various operations on the difference information D1.

The image processing apparatus 100, according to an embodiment, may determine weight information W based on the similarity information D2 (S920).

The image processing apparatus 100 may determine weight information, such that a weight value increases as a difference between the reference pixel and the adjacent pixel decreases, and the weight value decreases as the difference between the reference pixel and the adjacent pixel increases. For example, the image processing apparatus 100 may determine weight values, such that a weight value is closer to 0 as values included in the similarity information D2 increase in the negative direction, and the weight value is closer to 1 as magnitudes of the values included in the similarity information D2 decrease in the negative direction. In this case, the image processing apparatus 100 may determine the weight values by applying a natural exponential function or a softmax function to the values included in the similarity information D2. A case of applying the natural exponential function may be represented by Equation 1 described above, and a case of applying the softmax function may be represented by Equation 2 described above.

Referring back to FIG. 9, the image processing apparatus 100, according to an embodiment, may obtain first feature information by performing a convolution operation between the first image and a first kernel (S930). Also, the image processing apparatus 100 may additionally perform an activation function operation on the first feature information.

The image processing apparatus 100, according to an embodiment, may obtain second feature information by applying the weight information W to the first feature information (S940). For example, the image processing apparatus 100 may generate the second feature information by performing an elementwise multiplication operation of the first feature information and the weight information.

The image processing apparatus 100, according to an embodiment, may generate a second image based on the second feature information (S950). The second feature information may pass through convolution layers positioned next an edge preservation filter block, and while the second feature information passes through the convolution layers, a convolution operation and an activation function operation may be performed in each of the convolution layers. Accordingly, the second image may be generated.

Alternatively, the image processing apparatus 100 may obtain third feature information by performing a convolution operation between the second feature information and a second kernel, and the third feature information may pass through the convolution layers positioned next to the edge preservation filter block, and accordingly, the second image may be generated.

Alternatively, the image processing apparatus 100 may generate second weight information W2 by performing a convolution operation between the weight information W and a third kernel, and generate fourth feature information through an elementwise multiplication operation of the third feature information and second weight information. The fourth feature information may pass through the convolution layers positioned next to the edge preservation filter block, and accordingly, the second image may be generated.

Figure 10:
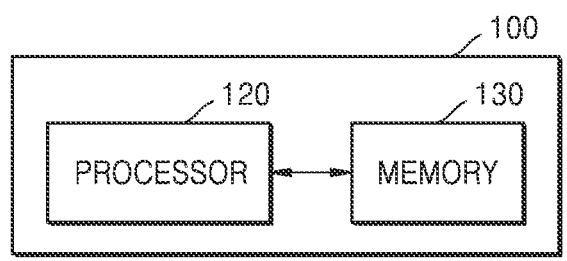
FIG. 10 is a block diagram of a configuration of an image processing apparatus, according to an embodiment.

FIG. 10 is a block diagram of a configuration of an image processing apparatus, according to an embodiment.

Referring to FIG. 10, the image processing apparatus 100, according to an embodiment, may include a processor 120 and a memory 130.

The processor 120, according to an embodiment, may control the image processing apparatus 100 overall. The processor 120, according to an embodiment, may execute one or more programs stored in the memory 130.

The memory 130, according to an embodiment, may store various data, programs, or applications for driving and controlling the image processing apparatus 100. A program stored in the memory 130 may include one or more instructions. The program (one or more instructions) or an application stored in the memory 130 may be executed by the processor 120.

The processor 120, according to an embodiment, may include at least one of a CPU, a GPU, and a video processing unit (VPU). Alternatively, according to an embodiment, the processor 120 may be implemented in the form of a system on chip (SoC) in which at least one of a CPU, a GPU, and a VPU is integrated. Alternatively, the processor 120 may further include a neural processing unit (NPU).

The processor 120, according to an embodiment, may use one or more image processing networks to generate an output image on which denoising for fine edge processing and maintaining texture while cancelling noise from an input image is performed. The image processing network 30, according to an embodiment, may include at least one edge preservation filter block and one or more convolution layers.

For example, the processor 120 may perform at least one of operations of the similarity calculator 210, the weight determiner 220, the first convolution unit 230, the weight applier 240, and the second convolution unit 250, which have been shown and described with reference to FIGS. 2 to 6, and may perform at least one of operations of the similarity calculator 710, the weight determiner 720, the first convolution unit 730, the first weight applier 740, the second convolution unit 750, the third convolution unit 760, and the second weight applier 770, which have been shown and described with reference to FIGS. 7 and 8.

The processor 120 may generate difference information indicating a difference between each of pixels included in a first image and adjacent pixels of each of the pixels. When the difference information is generated, the processor 120 may generate similarity information by performing a certain operation on each value included in the difference information. The similarity information, according to an embodiment, may include a value indicating a degree of similarity between the reference pixel and an adjacent pixel.

The processor 120 may determine weight information W based on the similarity information. The image processing apparatus 100 may determine weight information, such that a weight value increases as a difference between the reference pixel and the adjacent pixel decreases, and the weight value decreases as the difference between the reference pixel and the adjacent pixel increases.

The processor 120 may obtain first feature information by performing a convolution operation between the first image and a first kernel. The processor 120 may obtain second feature information by applying the weight information W to the first feature information.

The processor 120 may generate a second image based on the second feature information. For example, the second feature information may pass through convolution layers positioned next to the edge preservation filter block included in the image processing network 30. The processor 120 may perform a convolution operation and an activation function operation in each of the convolution layers and thus generate the second image.

Alternatively, the processor 120 may obtain third feature information by performing a convolution operation between the second feature information and a second kernel, and the third feature information may pass through the convolution layers positioned next to the edge preservation filter block included in the image processing network 30, and accordingly, the second image may be generated.

Alternatively, the processor 120 may generate second weight information W2 by performing a convolution operation between weight information and a third kernel, and generate fourth feature information through an elementwise multiplication operation of the third feature information and second weight information. The fourth feature information may pass through the convolution layers positioned next to the edge preservation filter block, and accordingly, the second image may be generated.

In addition, the image processing network 30, according to an embodiment, may be a network trained by a server or external device. The external device may train the image processing network 30 based on training data. In this case, the training data may include a plurality of data sets including image data including noise and image data in which an edge characteristic or texture characteristic is preserved while noise is cancelled.

The server or external device may determine parameter values included in kernels used in each of a plurality of convolution layers included in the image processing network 30 and kernels (e.g., a first kernel, a second kernel, and a third kernel) included in the edge preservation filter block. For example, the server or external device may determine the parameter values such that a difference (loss information) between image data generated by the image processing network 30 and image data, as training data, in which an edge characteristic or texture characteristic is maintained while noise is cancelled, is reduced.

The image processing apparatus 100, according to an embodiment, may receive the image processing network 30, which has completed training, from the server or external device and store the same in the memory 130. For example, the memory 130 may store a structure and parameter values of the image processing network 30 according to an embodiment, and by using the parameter values stored in the memory 130, the processor 120 may generate, from a first image according to an embodiment, a second image in which an edge characteristic or texture characteristic is preserved while noise is cancelled.

In addition, the block diagram of the image processing apparatus 100 shown in FIG. 10 is a block diagram for an embodiment. Each component of the block diagram may be integrated, added, or omitted according to the specifications of the image processing apparatus 100 that is actually implemented. That is, two or more components may be combined into one component, or one component may be subdivided into two or more components as needed. In addition, functions performed by each block are for explaining embodiments, and specific operations or devices thereof do not limit the scope of the disclosure.

The operating method of the image processing apparatus, according to the embodiment, may be embodied as program commands executable by various computer means and may be recorded on a computer-readable recording medium. The computer-readable recording medium may include program commands, a data file, a data structure, etc. alone or in combination. The program commands written to the computer-readable recording medium may be specifically designed and configured for the disclosure or may be well-known and available to one of ordinary skill in the art. Examples of the computer-readable recording medium may include magnetic media such as hard disks, floppy disks, and magnetic tapes, optical media such as compact disk read-only memory (CD-ROM) and digital versatile disks (DVDs), magneto-optical media such as floptical disks, and hardware devices especially configured to store and execute program commands, such as read-only memory (ROM), random access memory (RAM) and flash memory, etc. Examples of the program commands include advanced language code that can be executed by a computer by using an interpreter or the like as well as machine language code made by a compiler.

Also, the image processing apparatus and the operating method of the image processing apparatus according to the disclosed embodiments may be included in a computer program product and provided in that form. The computer program product is a commercial product that may be traded between a seller and a buyer.

The computer program product may include an S/W program or a computer-readable storage medium storing the S/W program. For example, the computer program product may include an S/W program product (e.g., a downloadable application) electronically distributed through a manufacturing company of an image processing apparatus or an electronic market (e.g., Google Play Store or App Store). For electronic distribution, at least a part of the S/W program may be stored in a storage medium or may be temporarily generated. In this case, the storage medium may be a storage medium of a server of a manufacturer, a server of an electronic market, or a relay server that temporarily stores the S/W program.

The computer program product may include a storage medium of a server or a storage medium of a client device in a system including the server and the client device. Alternatively, when there is a third device (e.g., a smartphone) communicating with the server or the client device, the computer program product may include a storage medium of the third device. Alternatively, the computer program product may include a software program itself transmitted from the server to the client device or the third device or from the third device to the client device.

In this case, one of the server, the client device, and the third device may execute a method according to disclosed embodiments by executing the computer program product.

Alternatively, at least two of the server, the client device, and the third device may execute the method according to disclosed embodiments in a distributed fashion by executing the computer program product.

For example, the server (e.g., a cloud server or an AI server) may execute the computer program product stored in the server and may control the client device communicating with the server to perform the method according to disclosed embodiments.

While embodiments have been described in detail, the scope of the disclosure is not limited thereto, and it will be understood by those of ordinary skill in the art that various changes in form and details may be made therein without departing from the spirit and scope as defined by the following claims.

What is claimed is:

1. An image processing apparatus comprising:
   a memory storing one or more instructions; and
   a processor configured to execute the one or more instructions to:
     obtain first similarity information, based on a pixel difference between each pixel included in a first image and a first adjacent pixel immediately to the right of each pixel included in the first image, wherein the first image comprises w×h pixels and the first similarity information comprises w×h elements;
     obtain second similarity information, based on a pixel difference between each pixel included in the first image and a second adjacent pixel immediately to the left of each pixel included in the first image, wherein the second similarity information comprises w×h elements;
     determine weight information based on the first similarity information and the second similarity information, wherein the weight information comprises w×h elements;
     obtain first feature information by performing a convolution operation between the first image and a first kernel, wherein the first feature information comprises w×h elements;
     obtain second feature information by performing an elementwise multiplication operation of the weight information and the first feature information; and
     generate a second image based on the second feature information.

2. The image processing apparatus of claim 1, wherein the processor is further configured to execute the one or more instructions to determine the weight information such that a weight value increases as the pixel difference between each pixel included in the first image and the first adjacent pixel decreases, and the weight value decreases as the pixel difference between each pixel included in the first image and the first adjacent pixel increases.

3. The image processing apparatus of claim 1, wherein the processor is further configured to execute the one or more instructions to determine the weight information by applying a natural exponential function or a softmax function to the first similarity information and the second similarity information.

4. The image processing apparatus of claim 1, wherein a number of channels of the first kernel is determined such that a number of channels of the weight information is equal to a number of channels of the first feature information.

5. The image processing apparatus of claim 1, wherein the processor is further configured to execute the one or more instructions to:
   obtain third feature information by performing a convolution operation between the second feature information and a second kernel, and
   generate the second image based on the third feature information.

6. The image processing apparatus of claim 1, wherein the processor is further configured to execute the one or more instructions to:
   obtain second weight information through a convolution operation between the weight information and a third kernel,
   obtain fourth feature information by applying the second weight information to the second feature information, and
   generate the second image based on the fourth feature information.

7. The image processing apparatus of claim 6, wherein the processor is further configured to execute the one or more instructions to obtain the fourth feature information by performing the elementwise multiplication operation of the second feature information and the second weight information.

8. The image processing apparatus of claim 1, wherein the processor is further configured to execute the one or more instructions to generate the second image by processing the first image by using a neural network including a plurality of layers,
   wherein the first image is input to an n-th layer among the plurality of layers, and
   wherein the second feature information is input to a (n+1)th layer among the plurality of layers.

9. An operating method of an image processing apparatus, the operating method comprising:
   obtaining first similarity information, based on a pixel difference between each pixel included in a first image and a first adjacent pixel immediately to the right of each pixel included in the first image, wherein the first image comprises w×h pixels and the first similarity information comprises w×h elements;
   obtaining second similarity information, based on a pixel difference between each pixel included in the first image and a second adjacent pixel immediately to the left of each pixel included in the first image, wherein the second similarity information comprises w×h elements;
   determining weight information based on the first similarity information and the second similarity information, wherein the weight information comprises w×h elements;
   obtaining first feature information by performing a convolution operation between the first image and a first kernel, wherein the first feature information comprises w×h elements;
   obtaining second feature information by performing an elementwise multiplication operation of the weight information and the first feature information; and
   generating a second image based on the second feature information.

10. The operating method of claim 9, wherein the determining the weight information comprises determining the weight information by applying a natural exponential function or a softmax function to the first similarity information and the second similarity information.

11. The operating method of claim 9, wherein a number of channels of the first kernel is determined such that a number of channels of the weight information is equal to a number of channels of the first feature information.

12. A non-transitory computer-readable recording medium having stored thereon a program, which when executed by a computer, performs a method comprising:
- obtaining first similarity information, based on a pixel difference between each pixel included in a first image and a first adjacent pixel immediately to the right of each pixel included in the first image of each pixel included in the first image, wherein the first image comprises w×h pixels and the first similarity information comprises w×h elements;
- obtaining second similarity information, based on a pixel difference between each pixel included in the first image and a second adjacent pixel immediately to the left of each pixel included in the first image, wherein the second similarity information comprises w×h elements;
- determining weight information based on the first similarity information and the second similarity information, wherein the weight information comprises w×h elements;
- obtaining first feature information by performing a convolution operation between the first image and a first kernel, wherein the first feature information comprises w×h elements;
- obtaining second feature information by performing an elementwise multiplication operation of the weight information and the first feature information; and
- generating a second image based on the second feature information.

* * * * *